United States Patent [19]
Hannon et al.

[11] Patent Number: 5,982,542
[45] Date of Patent: *Nov. 9, 1999

[54] HIGH LIGHT DIFFUSIVE AND LOW LIGHT ABSORBENT MATERIAL AND METHOD FOR MAKING AND USING SAME

[75] Inventors: Gregory E. Hannon, Newark, Del.; Gordon L. McGregor, Landenberg, Pa.; Raymond B. Minor, Elkton, Md.

[73] Assignee: W. L. Gore & Associates, Inc., Newark, Del.

[*] Notice: This patent is subject to a terminal disclaimer.

[21] Appl. No.: 08/910,096

[22] Filed: Aug. 12, 1997

Related U.S. Application Data

[63] Continuation of application No. 08/562,651, Nov. 27, 1995, Pat. No. 5,781,342, which is a continuation-in-part of application No. 08/369,850, Jan. 6, 1995, Pat. No. 5,596,450.

[51] Int. Cl.$^6$ .................................................. G02B 27/46
[52] U.S. Cl. ...................... 359/559; 359/599; 359/515
[58] Field of Search ................................. 359/599, 559, 359/515; 362/341; 526/242; 372/72, 98

[56] References Cited

U.S. PATENT DOCUMENTS

| | | | |
|---|---|---|---|
| 3,953,566 | 4/1976 | Gore | 264/288 |
| 3,962,153 | 6/1976 | Gore | 260/2.5 R |
| 4,035,085 | 7/1977 | Seiner | 356/179 |
| 4,096,227 | 6/1978 | Gore | 264/210 R |
| 4,152,618 | 5/1979 | Abe et al. | 313/116 |
| 4,187,390 | 2/1980 | Gore | 174/102 R |
| 4,354,741 | 10/1982 | Mano et al. | 350/357 |
| 4,463,045 | 7/1984 | Ahr et al. | 428/131 |
| 4,504,889 | 3/1985 | Goldfarb | 362/200 |
| 4,523,319 | 6/1985 | Pfost | 372/54 |
| 4,571,448 | 2/1986 | Barnett | 136/259 |
| 4,764,932 | 8/1988 | Peterson et al. | 372/35 |
| 4,772,124 | 9/1988 | Wooten et al. | 356/218 |
| 4,805,181 | 2/1989 | Gibson et al. | 372/72 |
| 4,902,423 | 2/1990 | Bacino | 210/500.36 |
| 4,912,720 | 3/1990 | Springsteen | 372/72 |
| 4,994,673 | 2/1991 | Perna et al. | 250/483.1 |
| 5,037,618 | 8/1991 | Hager | 422/186.03 |
| 5,051,878 | 9/1991 | Ngai | 362/299 |
| 5,075,827 | 12/1991 | Smith | 362/221 |
| 5,116,115 | 5/1992 | Lange et al. | 351/212 |
| 5,192,128 | 3/1993 | Ngai | 362/297 |
| 5,241,180 | 8/1993 | Ishaque et al. | 250/361 R |
| 5,263,042 | 11/1993 | Kojima et al. | 372/72 |
| 5,378,965 | 1/1995 | Dakin et al. | 315/248 |
| 5,422,756 | 6/1995 | Weber | 359/487 |
| 5,462,705 | 10/1995 | Springsteen | 264/122 |
| 5,488,473 | 1/1996 | Springsteen et al. | 356/317 |

FOREIGN PATENT DOCUMENTS

| | | |
|---|---|---|
| 0313263 | 10/1988 | European Pat. Off. . |
| 0372224 | 6/1990 | European Pat. Off. . |
| 0496323 A2 | 1/1992 | European Pat. Off. . |
| 7-235714 | 9/1995 | Japan . |
| 96/21168 | 7/1996 | WIPO . |

OTHER PUBLICATIONS

Robert D. Saunders and Henry J. Kostowski, "Roughened Quartz Surfaces and Teflon as small angle diffusers and depolarizers between 200 and 400 nm," Applied Optic, vol. 28, No. 15, Aug. 1, 1989 pp. 3242–3245.

(List continued on next page.)

*Primary Examiner*—Cassandra Spyrou
*Assistant Examiner*—Mohammad Y. Sikder
*Attorney, Agent, or Firm*—David J. Johns; Allan M. Wheatcraft

[57] ABSTRACT

The present invention is an improved material and method for use for providing diffuse transflectance of light. By employing an expanded polytetrafluoroethylene (PTFE) comprising a microstructure of polymeric nodes and fibrils, the material of the present invention demonstrates exceptional diffuse reflectivity and transmission of light across a wide spectrum of ultraviolet, visible, and infrared light. Additionally, the material of the present invention provides many properties that have been previously unavailable in highly diffuse transflective material, including a high degree of malleability, moldability and flexibility, and effective reflectivity even at relatively thin cross-sections.

9 Claims, 11 Drawing Sheets

OTHER PUBLICATIONS

Victor R. Weidner and Jack J. Hsia, "Reflection Properties of Pressed Polytetrafluoroethylene Powder," J. Optical Society of America, vol. 71, No. 7, Jul. 1981, pp. 856–861 International Search Report for PCT/US96/15111.

S. Nutter, C.R. Bower, N.W. Gebhard, R.M. Heinz and G. Spiczak, "Sintered Holan as a Diffuse Reflecting Liner for Light Integration Boxes," Nuclear Instruments & Methods in Physics Research, vol. A310, No. 3, Dec. 15, 1991, pp. 665–670.

International Search Report for PCT/US96/15111.

International Search Report for PCT/US96/16142.

Literature: TK Lewellen, RS Miyaoka, SG Kohlmyer, "Improving the Performance of the SP–3000 PET Detector Modules," University of Washington, Seattle, Washington, Nov. 1991, pp. 1604–1608.

Literature: K. Wisshak, F. Kappeler, and H. Muller, "Prototype Crystals For the Karlsruhe 4 Barium Fluoride Detector," Physics Research A251 (1986) 101–107.

Literature: Carol J. Bruegge, Albert E. Stiegman, Daniel R. Coulter, Robert R. Hale, David J. Diner, "Reflectance stability analysis of Spectralon diffuse calibration panels," SPIE vol. 1493 (1991), pp. 132–142.

Literature: A.W. Springsteen, "A Novel Class of Lambertian Reflectance Materials for Remote Sensing Application," Labsphere, Inc., SPIE, vol. 1109, Optical Radiation Measurements II (1989) pp. 133–141.

HIGH LIGHT DIFFUSIVE AND LOW LIGHT ABSORBENT MATERIAL AND METHOD FOR MAKING AND USING SAME

The present application is a continuation of U.S. patent application Ser. No. 08/562,651, filed Nov. 27, 1995, now U.S. Pat. No. 5,781,342, which is a continuation-in-part of U.S. patent Ser. No. 08/369,850, filed Jan. 6, 1995, now U.S. Pat. No. 5,596,450.

BACKGROUND OF THE INVENTION

1. Field of the Invention

The present invention relates to surfaces used to reflect and transmit light, and particularly to materials that reflect and transmit even diffusion of light energy from or through their surfaces.

2. Description of Related Art

Special light reflectant surfaces are used in a variety of applications requiring light energy to be close to completely reflected while providing an even distribution of light from the surface. While good mirrored surfaces can provide nearly perfect reflectivity of visible light, the light energy exiting these surfaces does so only at an angle equal to the incident angle of light contact. For many applications it is important that light be reflected with an even distribution of light from the surface. This latter property is referred to as diffuse or "lambertian" reflectance. For instance, projection screens, such as those used for slide or motion picture presentations, must provide both high reflectivity and a light diffusion/distribution over a sufficiently wide field so as to provide a clear image to most of an audience. Many reflectant screens employ a coating of glass beads or similar material as a reflectant aid to provide excellent reflectivity over a defined projection field (e.g., approximately 20° from a center line), with significantly diminished reflectivity outside of the defined projection field. These screens provide very good viewing within the defined field, and are less prone to interference from stray light sources other than the primary light source aimed perpendicular to the screen. In order to provide better viewing to a wider defined field, matte-finished screens are effective at providing a more even light distribution to an entire audience. Although hardly critical for most projection screen applications in darkened rooms, in either instance it is important that the screen absorb or transmit as little light as possible so as to assure maximum reflective image to the audience.

Reflectivity is far more critical in many other applications. For instance, displays used in electronic equipment (e.g., instrument panels, portable computer screens, liquid crystal displays (LCDs), etc.), whether relying on supplemental lights (e.g., backlight) or merely ambient light, require very good diffuse reflectant back surfaces to maximize image quality. Reflectivity is particularly critical with backlighted displays in battery powered equipment, where better reflectivity is directly related to smaller required light sources and resulting lower power demands.

Even more demanding applications for highly reflective materials are in casings used in laser or optical test equipment construction. Since the efficiency of such equipment is directly dependent upon its ability to effectively process light energy, it is critical that the equipment be constructed with material that has extremely high reflectivity and excellent diffusion properties.

Contrastly, there are a variety of applications where it is preferred to provide effective light transmittance through a material. Examples of these applications include some diffusion filters, rear projection screens, transflective displays, etc. With most materials which reflect and transmit light there is also an absorption component. In cases where both reflectance and transmittance are needed concurrently, absorption of light energy is undesired because it results in wasted light energy.

In the case of rear projection screens, the screen is positioned in between the light source and the audience. These screens trade-off reflectance for transmittance while maintaining a high level of diffusivity. Once again, to maximize the light energy output, it is important that the screen material absorb the lowest amount of light possible.

Another application where a trade off of reflectance for transmittance is desired is in certain avionic transflective LCD displays. These transflective (both reflective and transmittive) displays employ a reflector that supplies light to an LCD display using ambient light. In this case, where ambient light is insufficient to light the LCD display, a backlight is used. This backlight supplies light through the reflector; hence, the reflector must have both reflectance and transmittance properties. Under these conditions, both diffuse reflectance and diffuse transmittance are desired while absorption of light is not desired.

Another application of where diffuse reflective materials are employed is as a diffuser in solar collectors or photovoltaic cells. Since solar-driven devices such as these generally use sunlight in the range of 300 to 2200 nm, the diffuse nature and low absorption of the present invention are particularly suitable. As is described in U.S. Pat. No. 4,571,448, issued to A. M. Barnett, a photovoltaic cell can have increased efficiency by providing a diffuse textured reflective back surface. In these applications, it would appear desirable to provide a material that can further increase reflection efficiency over the entire solar spectrum of 300 to 2200 nm.

Due to the many different applications that exist for reflectant materials, it is not surprising that there are many different commercially available products with a variety of diffuse reflective properties. Until the present invention, the best material known with excellent diffuse reflectivity was that described in U.S. Pat. No. 4,912,720 and sold under the trademark SPECTRALON by Labsphere, Inc., North Sutton, N.H. This material comprises lightly packed granules of polytetrafluoroethylene that has a void volume of about 30 to 50% and is sintered into a relatively hard cohesive block so as to maintain such void volume. Using the techniques taught by U.S. Pat. No. 4,912,720, it is asserted that exceptionally high diffuse visible light reflectance characteristics can be achieved With this material, with reflectance over previously available reflectant material increasing from 97% to better than 99%.

Despite the reported advantages of SPECTRALON material, it is considered quite deficient in many respects. First, this product is a relatively hard block of material that must be carefully carved or machined to desired shapes and dimensions. This severely limits how and where this material can be used and greatly increases the cost of using this material in many applications, especially where non-planar shapes are desired. Therefore, where a pliable material is desired in various light reflective applications, it is clear that the SPECTRALON material is not capable of supplying such a property. Furthermore, the additional machining process provides yet another source for contamination that can be detrimental to its reflective properties.

Second, the SPECTRALON material is apparently limited, both structurally and in its ability to reflect light, to a relatively thick minimum depth (i.e., a thickness of greater than 4 mm). Again, this serves to limit where and how this material can be used. Moreover, this limitation tends needlessly to increase both the amount of material required for a given application as well as the weight of the material required for such application.

Third, the SPECTRALON material is apparently relatively expensive to manufacture and purchase. These costs are only increased by the material's difficulty in processing into the final shape from the hard form (i.e., excessive amounts of material may have to be machined away and discarded during production) and its minimum thickness requirements. As a result, the SPECTRALON material is too expensive to be used in many applications that might otherwise benefit from its reflective properties.

Fourth, although SPECTRALON has high diffuse reflective properties, it is contemplated that even better performance may be possible in this regard. For instance, the SPECTRALON material has very good reflective properties for visible light up to a near IR range (i.e., from 300 to 1800 nm), the reflectivity of this material diminishes dramatically above 1800 nm. Moreover, it is believed that even better reflective performance might be possible even in the visible light range where SPECTRALON material delivers its best performance.

Another material which is commonly used as both a diffuse reflector and transflector is barium sulfate. Barium sulfate is applied in a powder form on various substrates, such as metal or glass, to address specific reflectance or transflectance needs. While it does provide relatively good optical properties, barium sulfate is difficult to apply evenly and tends to flake off in end use applications, especially where vibration and or abrasion are present.

It is accordingly a primary purpose of the present invention to provide an improved highly light diffuse material and method of use that can perform as well or better than existing diffuse reflective or transflective materials and has better handling characteristics.

This and other purposes of the present invention will become evident from review of the following specification.

SUMMARY OF THE INVENTION

The present invention relates to an improved light redirecting material that is effective at both diffusely reflecting and diffusely transmitting light. Materials capable of both reflecting and transmitting light energy are known in the art as transflectant materials. The present invention employs a light redirecting material of expanded polytetrafluoroethylene (PTFE) comprising polymeric nodes interconnected by fibrils defining a microporous structure. It has been determined that this structure provides diffuse reflectivity and diffuse transmittance, which combined make use of up to and above 99% of light provided.

Equally important, the material employed in the present invention demonstrates many other properties that make it particularly desirable for use as a reflectant and or transmittant material. First, the material is highly flexible, allowing it to be twisted and formed into a variety of shapes. This property vastly reduces the effort necessary to form many complicated reflective or transflective structures, and particularly non-planar structures. Moreover, many previously unattainable structures, such as extremely reflectant bendable structures, are now attainable through use of the present invention. Second, the material used in the present invention demonstrates excellent optical uniformity and stability with respect to vibration and other environmental factors.

A further improvement of the material of the present invention is that it can be combined with other reflectant materials to provide unique reflective qualities. For example, by attaching a second reflective material, such as a metal layer, against a thin transflective material of the present invention, a composite material can be provided with excellent reflective properties, better than the second reflective material alone, plus vastly improved diffuse reflectivity from the second reflective material.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved material and method for providing excellent diffuse light redirecting characteristics in a variety of products.

As the term "light" is used herein, it is intended to include any form of electromagnetic radiation, but especially that in the spectrum of visible light (400 to 700 nm wavelength), up through infrared (IR) light radiation (700 to greater than 2500 nm wavelength), and down through the ultraviolet (UV) light spectrum (400 to 250 nm and below). It should be appreciated that the material of the present invention may be tailored to modify reflectance or transmittance in particular bands of light energy through the use of coatings, fillers, or similar materials. As the term "light redirecting" is employed herein, it is intended to define any function of reflecting, transmitting, diffusing, transfecting, or otherwise altering the path of light from or through a material.

The present invention is primarily concerned with maximizing the amount of light energy either reflected from or transmitted through a material, with a minimal amount of light energy absorbed by the material itself. For simplicity, the property of a material to either reflect or transmit light energy in this manner is referred to in this application as "transflectance" or "transflectivity."

Figure 1:
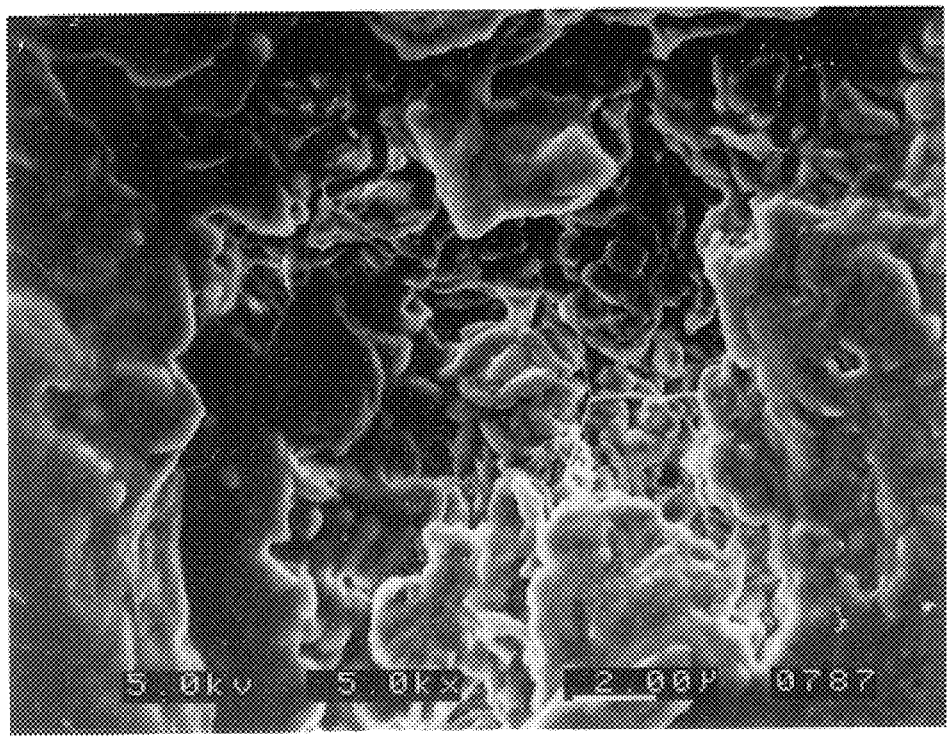
FIG. 1 is a scanning electron micrograph (SEM), enlarged 5000 times, showing the surface of a light redirecting material of a commercially available diffuse reflective material.

As has been explained, the best diffuse reflectant material commercially available today is that sold under the trademark SPECTRALON by Labsphere, Inc., of North Sutton, N.H. This material comprises a granular polytetrafluoroethylene material that is lightly packed and then molded into a rigid block. FIG. 1 is a scanning electron micrograph (SEM) of a surface of a ½ inch thick reflectant sheet of SPECTRALON material. While this material provides good reflectivity of visible and near IR light, providing up to about 99% diffuse, "lambertian," reflectance over portions of that spectrum of light, the material has a number of drawbacks that constrain its use. Among the perceived problems with this material are: difficulty in processing due to its rigidity, especially where non-planar reflectant surfaces are required; limited range of effective light reflectance across visible and IR light spectrum; relatively thick minimum thicknesses (i.e., its effective reflectance diminishes at thicknesses of less than about 4 mm); and less than optimum diffuse reflectivity. Despite these deficiencies, this material is considered the present standard by which the diffuse reflectivity of all other materials is measured.

Figure 2:
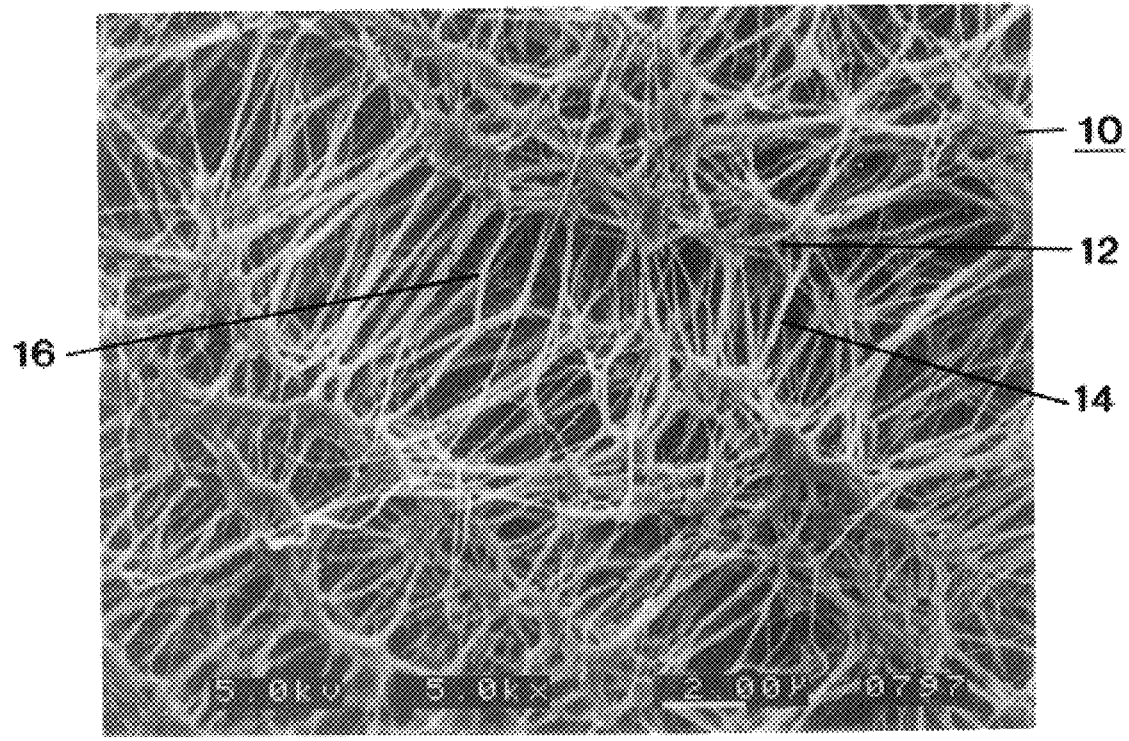
FIG. 2 is an SEM, enlarged 5000 times, showing the surface of one embodiment of a light redirecting material of the present invention.

The present invention employs a distinctly different light redirecting material comprising an expanded polytetrafluoroethylene (PTFE), such as that made in accordance with U.S. Pat. Nos. 3,953,566, 3,962,153, 4,096,227, 4,187,390, and 4,902,423, all incorporated by reference. This expanded PTFE material comprises a microporous structure of microscopic polymeric fibrils (i.e., thread-like elements) interconnecting polymeric nodes (i.e., particles from which fibrils emerge). The structure of a biaxially expanded example of this material is shown in the SEM of FIG. 2. This material 10 comprises polymeric nodes 12 and numerous fibrils 14 extending from the nodes 12. As can be seen, numerous microporous voids 16 are provided within the material 10. As the term "expanded PTFF" is used herein, it is intended to include any PTFE material having a node and fibril structure, including in the range from a slightly expanded structure having fibrils extending from relatively large nodes of polymeric material, to an extremely expanded structure having fibrils merely intersect with one another at nodal points.

Expanded PTFE has a number of important properties that make it particularly suitable as a light redirecting surface of the present invention. First, PTFE is a highly inert material that is hydrophobic. Accordingly, the material is resistant to both water and a wide variety of other materials that could damage some other reflectant surfaces. Additionally, by expanding PTFE in the manner taught by U.S. Pat. No. 3,953,566 to form the node and fibril structure, the material undergoes a significant increase in tensile strength and becomes highly flexible making it ideally suitable for applications requiring thicknesses of less than 0.25 mm, less than 0.1 mm, less than 0.05 mm and even less than 0.01 mm. Moreover, while packed granular based PTFE material provides good diffuse reflectant properties, its tensile properties are relatively weak limiting its use in applications requiring thin material cross sections. Furthermore, it has been discovered that the node and fibril structure of expanded PTFE provides a much higher diffuse reflectance property as well as providing both transflective and transmittant properties.

A preferred diffuse light redirecting material of the present invention is made in the following manner. A fine powder PTFE resin is blended with a lubricant, such as odorless mineral spirits, until a compound is formed. The volume of lubricant used should be sufficient to lubricate primary particles of the PTFE resin so to minimize the potential of the shearing of the particles prior to extruding.

The compound is then compressed into a billet and extruded, such as through a ram type extruder, to form a coherent sheet of extrudate. A reduction ratio of about 30:1 to 300:1 may be used (i.e., reduction ratio=cross-sectional area of extrusion cylinder divided by the cross-sectional area of the extrusion die). For most applications a reduction ratio of 75:1 to 100:1 is preferred.

The lubricant may then be removed, such as through volatilization, and the dry coherent extrudate sheet is expanded rapidly in at least one direction about 1.1 to 50 times its original length (with about 1.5 to 2.5 times being preferred). Expansion may be accomplished, such as through the method taught in U.S. Pat. No. 3,953,566, by passing the dry coherent extrudate over a series of rotating heated rollers or heated plates at a temperature of between about 100 and 325° C. Alternatively, the extruded sheet may be expanded in the manner described in U.S. Pat. No. 4,902,423 to Bacino prior to removal of the lubricant.

In either case, the material may be further expanded at a ratio of 1.1:1 to 50:1 (with 5:1 to 35:1 being preferred) to form a final microporous sheet. Preferably the sheet is biaxially expanded so as to increase its strength in both its longitudinal and transverse directions. Finally, the material may be subjected to an amorphous locking step by exposing it to a temperature in excess of 340° C.

The material of the present invention is preferably made in the form of sheets, which, due to their inherent flexibility, may be formed into a wide variety of other shapes as desired, such as tubes, strips, convex or concave structures, etc. Additionally, to address particular applications, the material of the present invention may likewise be extruded or otherwise formed into continuous tubes, rods (i.e., cylinders), rectangles, uneven shapes and other structures that may be of interest.

Sheets made from the above processing steps can be produced in thicknesses ranging from, but not limited to, 0.01 mm to 2 mm. Sheets can be subsequently layered upon themselves and subjected to temperatures ranging from about 300° C. to 400° C. while applying sufficient pressures to bond the layers together. The final sheets may range from less than 0.5 mm to 6 mm or even 12 mm or more in thickness.

It has been determined that by providing a microporous surface of polymeric nodes and fibrils, such as that of expanded PTFE, and particularly one that has been expanded in more than one direction, light is reflected and/or transmitted off the node and fibril structure with very even diffuse dispersion (i.e., diffusion) of the light and without significant loss of light due to absorption. In this regard, it has been determined that the material of the present invention can provide diffuse reflectance and/or diffuse transmittance of light energy. For example, it has been determined that the material of the present invention will either reflect or transmit light energy at greater than 99% over a wide range of light wavelengths from 250 to 2500 nm. In other words, the material of the present invention is extremely efficient at redirecting light from or through its surface, with very little absorbence of light energy occurring into the material itself.

As desired, the material of the present invention can be modified with selected fillers or coatings to provide selected light absorbence in certain ranges of light wavelengths and high transflectance in other ranges. Still another benefit of the present invention is that it can be used to provide vastly improved optical properties by combining it with other reflective or transmittive material, such as metal sheets or coatings.

It is believed that the present invention will have its highest value in the ultraviolet to visible range of light (about 250 to 750 nm wavelength). In this range, the material of the present invention easily provides greater than 90% reflectivity with 91%, 92%, 93%, 94%, 95%, 96%, 97%, 98%, 99%, and near 100% reflectivity possible over part or all of the range of wavelengths from 250 to 750 nm and beyond.

Another benefit of the present invention is that the material provides transflectivity of light that is very stable and does not cause distortion or "shift" of light leaving the surface of the material. As a result, the material of the present invention is particularly suitable for providing very true reflectance and transmittance of light energy, without distorting the light energy.

Still another important benefit of the present invention is that the material is highly inert and durable. As a result, the material has the unique ability of being an excellent diffuser while enjoying all of the benefits of being an expanded PTFE material, such as being very resistant to chemical attack and UV light degradation as well as exhibiting high tensile strength.

Figure 3:
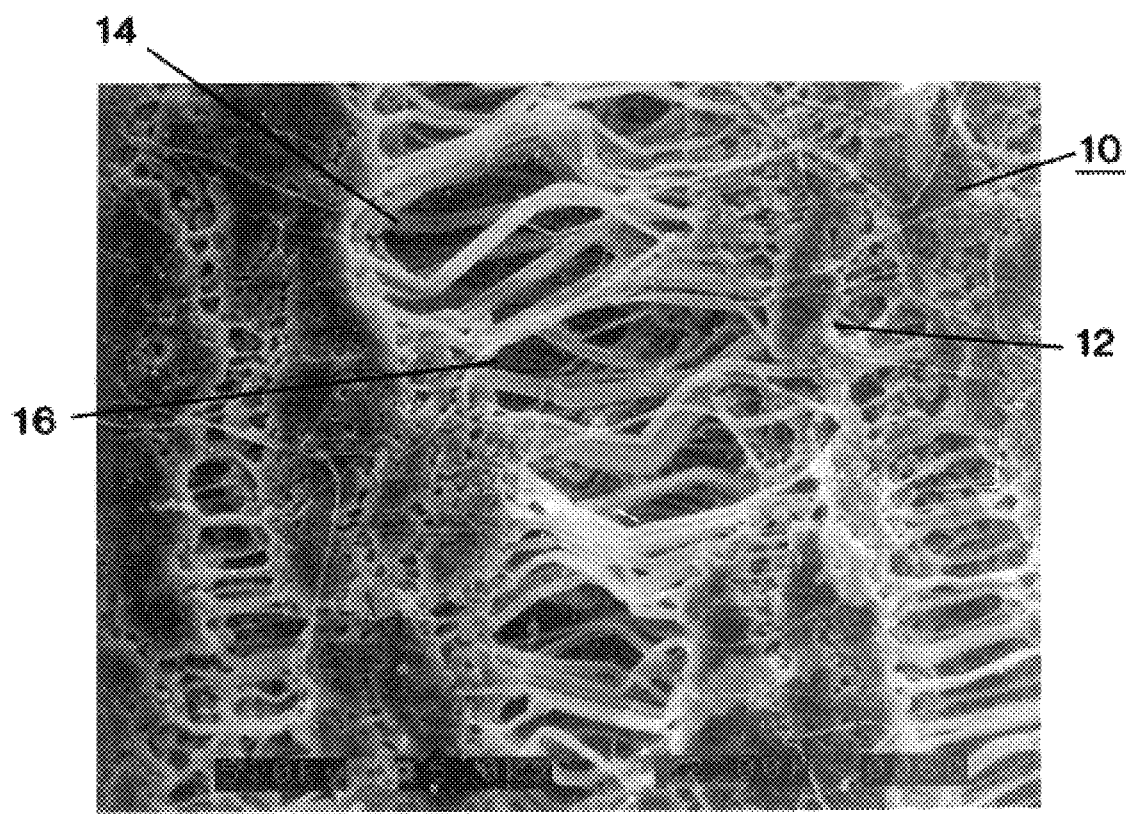
FIG. 3 is an SEM, enlarged 5000 times, showing the surface of another embodiment of a light redirecting material of the present invention.

The SEM of FIG. 2 shows expanded PTFE material 10 of the present invention that has undergone extensive expansion in two different directions. This structure exhibits a relatively "fine" structure with fibrils 14 oriented in both x and y directions, and small nodes 12 where the fibrils intersect. Still another embodiment of the present invention is shown in the SEM of FIG. 3. In this case, the expanded PTFE has been expanded in only the longitudinal direction. In this example there is a "coarser" structure characterized by larger nodes 12 and thicker fibrils 14. The fibrils 14 are oriented predominantly in a longitudinal direction.

As is explained in greater detail below, the present invention demonstrates extremely high diffuse reflectivity. When compared to the present reflectant standard of SPECTRALON material, the reflectant material of the present invention exhibited substantially higher diffuse reflectivity. Moreover, the reflectivity of the material of the present invention proved to have a number of other dramatically improved properties over the present standard. First, the reflectivity of the material remains high across a much wider spectrum of light wavelengths. Second, the material of the present invention demonstrates exceptional reflectivity even at much thinner profiles as compared with the existing standard material. Third, the material exhibits a very predictable, flat-line reflective response across a wide spectrum of light.

Figure 4:
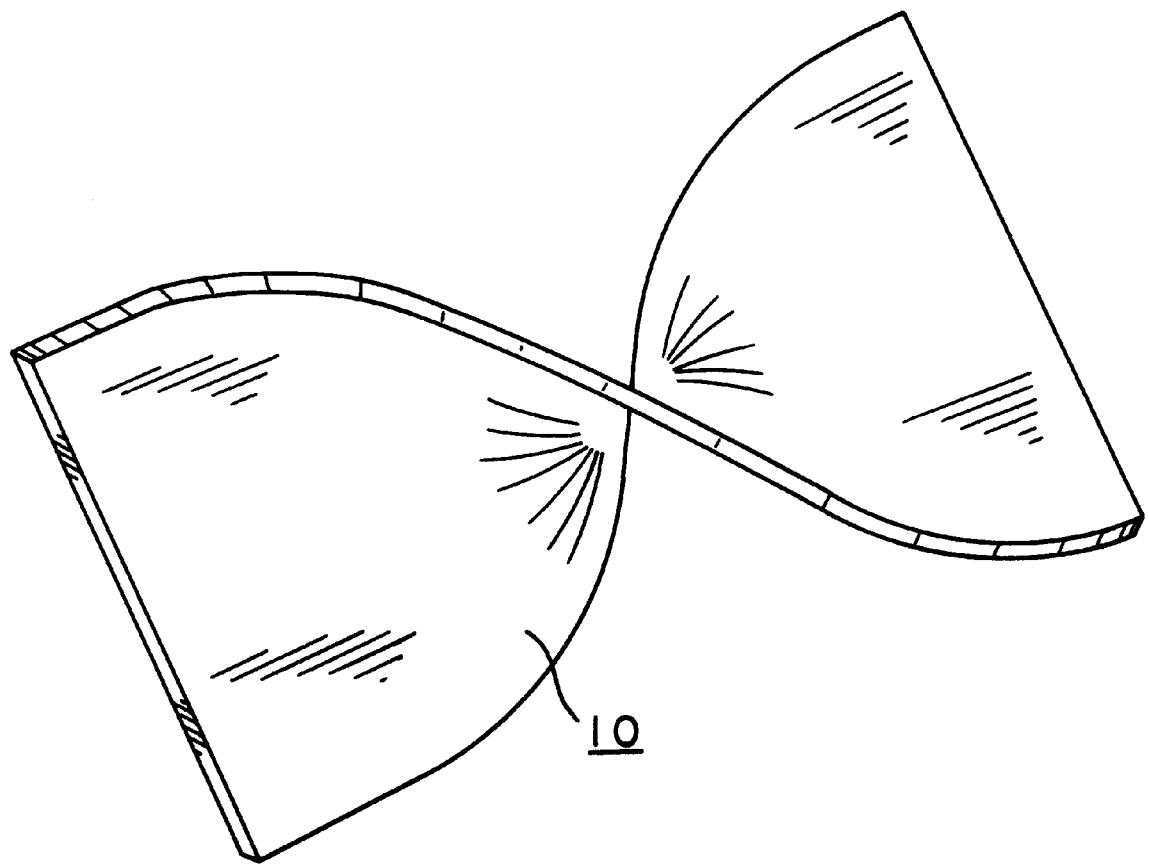
FIG. 4 is a three-quarter isometric view of a light redirecting material of the present invention, wherein the flexibility of the material is demonstrated.

Another important improvement of the present invention is shown in FIG. 4. The light redirecting material 10 of the present invention is highly malleable, moldable, and flexible, allowing it to be bent, twisted, curved, or otherwise formed into any suitable shape. In this respect, the light redirecting material of the present invention is a dramatic improvement over previously available diffusely reflectant and/or transmittant materials, such as SPECTRALON polytetrafluoroethylene reflectant materials that must be carved or machined into desired shapes, or barium sulfate which is difficult to apply evenly and has limited stability. With the material of the present invention, a host of different non-planar shapes can be formed with minimal effort. These types of thin, flexible, formable materials having at less than 90% reflectance and therefore in excess of 10% transmittance should have great value for a host of applications such as projection screens (in particular but not limited to rear projection screens) and backlighted displays (in particular but not limited to transflective backlighted displays).

The present invention may comprise single or multiple layers of expanded PTFE, or may comprise a laminate of one or more layers of expanded PTFE and a backing support material. Since the expanded PTFE membrane alone tends to be susceptible to stretch and distortion, for some applications it may be preferred that the membrane be mounted to a support layer, such as through lamination to a flexible woven or non-woven material, that will help maintain the shape of the image layer during use. One suitable support layer is applied by applying an adhesive material, such as moisture curable polyurethane or solvated polyurethane, to the expanded PTFE membrane and then applying the adhesive-coated expanded PTFE membrane to a flexible backing material (e.g., polyester, polypropylene, MYLAR@, KEVLAR®, nylon, etc.). The two materials can then be bonded to each other under applied pressure, such as by rolling the material between one or more pairs of nip rollers. With use of a moisture curable polyurethane adhesive to bond an expanded PTFE membrane to a woven fabric, such as nylon, pressure of 1150 g per linear meter is applied to bond the materials together. The materials are then allowed to moisture cure for a period of about 48 hours before use.

In addition, to create complex shapes, an expanded PTFE sheet can be bonded to a rigid support material and then formed as a composite into shapes, such as parabolic or ellipsoidal domes. One suitable method for such forming techniques comprises using vacuum forming devices.

Without intending to limit the scope of the present invention, the following examples illustrate how the present invention may be made and used:

EXAMPLE 1

A light redirecting material of the present invention was prepared in the following manner:

A fine powder PTFE resin was combined in a blender with odorless mineral spirits (ISOPAR K available from Exxon Corp.) until a compound was obtained. The volume of mineral spirits used per gram of fine powder PTFE resin was 0.275 cc/gm. The compound was compressed into a billet and extruded through a 1.14 mm gap die attached to a ram type extruder to form a coherent extrudate. A reduction ratio of 47:1 was used.

Subsequently, the odorless mineral spirit was volatilized and removed, and the dry coherent extrudate was expanded unaxially in the longitudinal direction 4.0 times its original length by passing the dry coherent extrudate over a series of rotating heated rollers at a temperature of 300° C. The sheet was subsequently subjected to an amorphous locking step by passing the sheet over a series of rotating heated rollers at a temperature of 385° C. such that the material was in contact with the rollers for about 12 seconds.

This material forms a relatively course expanded structure such as that shown in FIG. 3.

EXAMPLE 2

Another sheet of the present invention was produced in the same manner as Example 1 except for the following differences:

The volume of mineral spirits used per gram of fine powder PTFE resin was 0.297 cc/gm. The compound was compressed into a billet and extruded through a 1.52 mm gap die attached to a ram type extruder to form a coherent extrudate. A reduction ratio of 70:1 was used.

Subsequently, the odorless mineral spirit was volatilized and removed. Three layers of the dry coherent extrudate were then stacked and expanded unaxially in the longitudinal direction 4.6 times its original length by passing the dry coherent extrudate over a series of rotating heated rollers at a temperature of 310° C. The sheet was subsequently subjected to an amorphous locking step by passing the sheet over a series of rotating heated rollers at a temperature of 385° C. for about 40 seconds.

Again, this material forms a relatively course expanded structure such as that shown in FIG. 3.

EXAMPLE 3

A sheet of the present invention was produced in the following manner:

A fine powder PTFE resin was combined with an odorless mineral spirit. The volume of mineral spirits used per gram of fine powder PTFE resin was 0.275 cc/gm. This mixture was aged below room temperature to allow for the mineral spirits to become uniformly distributed within the PTFE fine powder resin. This mixture was compressed into a billet and extruded at approximately 8300 kPa through a 0.71 mm gap die attached to a ram type extruder to form a coherent extrudate. A reduction ratio of 75:1 was used.

The extrudate was then rolled down between two metal rolls which were heated to between 30°–40° C. The final thickness after roll down was 0.20 mm. The material was transversely expanded at a ratio of 3:1 and then the mineral spirits were removed from the extrudate by heating the mass to 240° C. (i.e., a temperature where the mineral spirits were highly volatile). The dried extrudate was transversely expanded at 150° C. at a ratio of 3.5:1. After expansion, the sheet was amorphously locked at greater than 340° C. and cooled to room temperature. This material forms a relatively fine expanded structure such as that shown in FIG. 2.

Multiple layers of this sheet material can then be stacked, placed under pressure, and exposed to a temperature of about 360° C. for about 30 minutes to bond the layers into a cohesive sheet of virtually any desired thickness.

EXAMPLE 4

Layered expanded PTFE material similar to that described in Example 3 above is commercially available from W. L. Gore & Associates, Inc., Elkton, Md., as a sheet gasket material under the trademark GORE-TEX GR® sheet gasketing. This material is available in different thicknesses (i.e., constituting different number of layers formed into cohesive sheets). In order to test the effectiveness of the material of the present invention as compared to commercially available light reflectant materials, various samples of sheet gasketing material were tested as follows:

Sample 1: A composite sheet comprising about 15 layers of expanded PTFE sheets with the following properties:
Thickness: 0.5 mm
Density: 0.60 g/cc
Sample 2: A composite sheet comprising about 25 layers of expanded PTFE sheets with the following properties:
Thickness: 1.0 mm
Density: 0.57 g/cc
Sample 3: A composite sheet comprising about 60 layers of expanded PTFE sheets with the following properties:
Thickness: 2.2 mm
Density: 0.61 g/cc
Sample 4: A composite sheet comprising about 85 layers of expanded PTFE sheets with the following properties:
Thickness: 3.4 mm
Density: 0.59 g/cc
Sample 5: A composite sheet comprising about 150 layers of expanded PTFE sheets with the following properties:
Thickness: 6.2 mm
Density: 0.51 g/cc Additionally, material similar to that described in Examples 1 and 2, above, is commercially available from W. L. Gore & Associates, Inc., as a gasket tape under the trademark GORE-TEX® gasket tape. Again, this material is available in different thicknesses. Samples of this material were tested as follows:

Sample 6: A gasket tape comprising a single layer of relatively course expanded PTFE with the following properties:
Thickness: 1.0 mm
Density: 0.50 g/cc
Sample 7: A gasket tape comprising a single layer of relatively course expanded PTFE with the following properties:
Thickness: 3.3 mm
Density: 0.66 g/cc Each of Samples 1 through 7 were tested in the following manner to quantify their reflective properties:

A 2 inch by 2 inch swatch from each of Samples 1 through 7 was placed in a CARY 5E Spectrophotometer with a Labsphere integrating sphere. The spectral range measured was 175 nm to 2500 nm. Data below 250 nm was not reported due to the unreliability of the standard material below this value. All measurements were made in the double-beam mode with the same working standard in the sphere's reference reflectance port. The reflectance standard used was of SPECTRALON material, Labsphere Serial Number SRS-99-010-8111-A. Photomultiplier detection was used below 800 nm and lead sulfide detection was used above 800 nm. All measurements were normalized with respect to the baseline of the system. This data is then corrected by multiplying it by the correction factors supplied with the reflectance standard. This data was then averaged and plotted.

Figure 5:
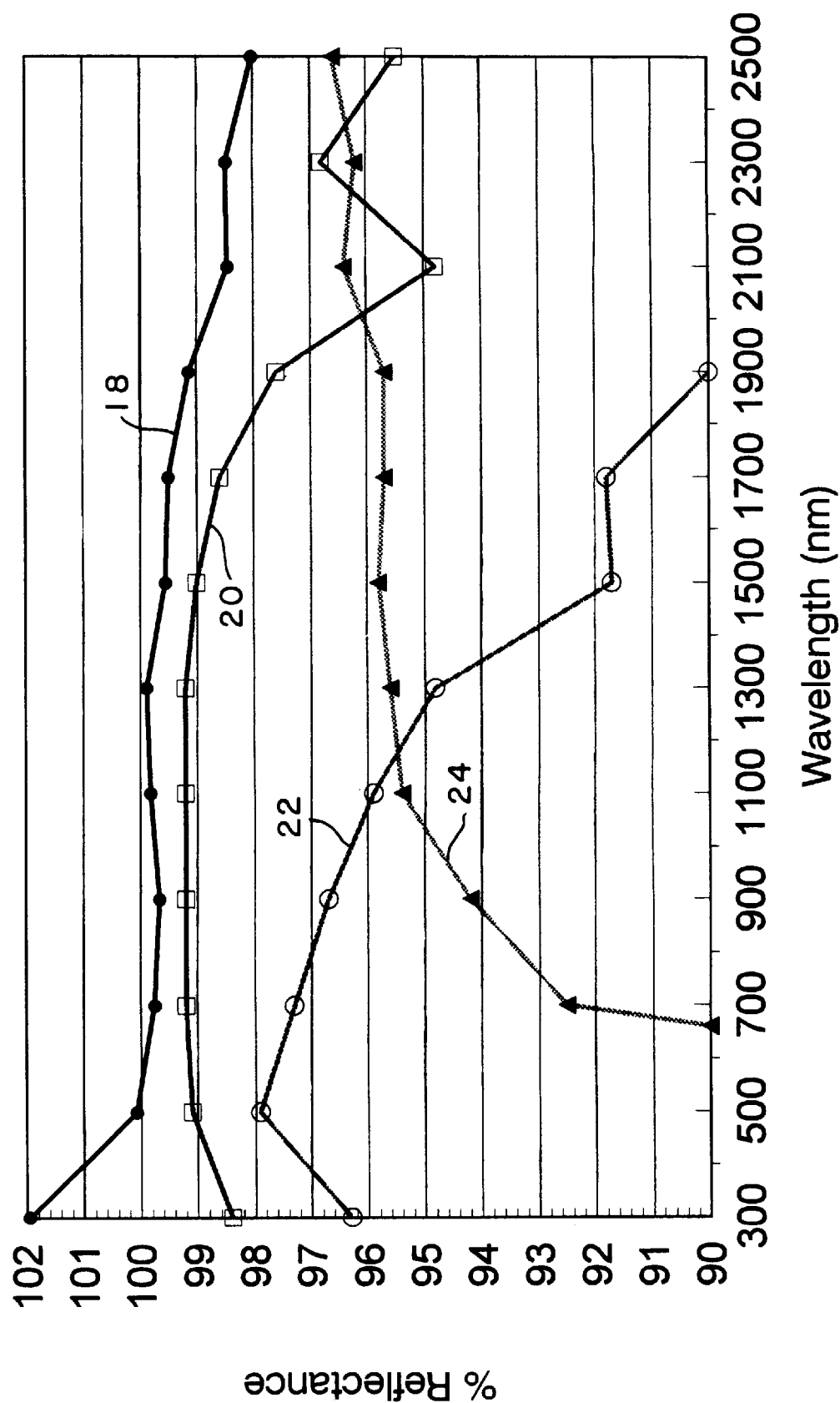
FIG. 5 is a graph plotting the reflectance versus wavelength of a light redirecting material of the present invention as compared to commercially available materials.

The graph of FIG. 5 records the reflectance versus light wavelength of one sample of the present invention as compared with three commercially available reflectant materials. Line 18 is the performance of the material of Sample 5 of the present invention as compared with commercially available reflectant materials SPECTRALON (Line 20), SPECTRAFLECT (Line 22), and INFRAGOLD (Line 24), each available from Labsphere, Inc., North Sutton, N.H. These materials are represented by their manufacturer to be some of the highest diffuse reflectant materials available. The data plotted for the commercially available materials was obtained from the technical information catalog published by Labsphere, Inc. As can be seen, at all wavelengths of light tested, the reflectant material of the present invention demonstrated markedly higher reflectivity than the commercially available reflectant materials. Additionally, the material of the present invention retained its reflective properties into much higher wavelengths than the commercial materials.

It should be noted here that the reflectivity numbers reported herein are not asserted to show better than complete reflectance of light, but, rather, as demonstrating significantly better reflectance than the present state-of-the-art SPECTRALON reflectant material used as a standard.

Figure 6:
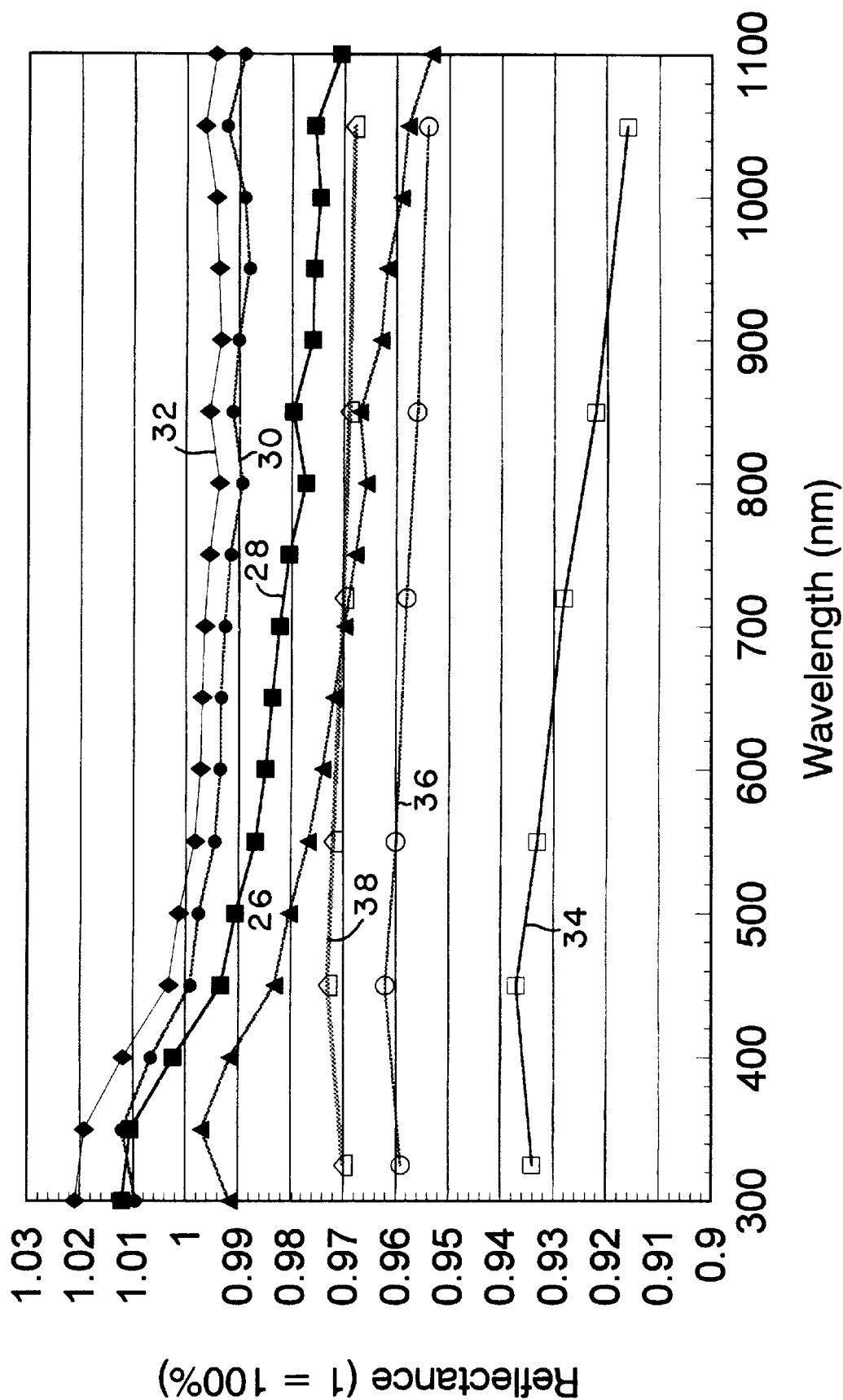
FIG. 6 is a graph plotting the reflectance versus wavelength of varying thicknesses of the light redirecting material of the present invention as compared to commercially available materials.

The graph of FIG. 6 records the reflectance versus light wavelength of different thicknesses of inventive material compared to similar thicknesses of SPECTRALON reflective material. Lines 26, 28, 30, and 32, respectively, represent the performance of Samples 1, 2, 3, and 4 of the present invention. By way of comparison, lines 34, 36, and 38 respectively represent the performance of 1.0 mm, 2.0 mm, and 3.0 mm thick samples of SPECTRALON material according to published data from the technical catalog of Labsphere, Inc. Sample 1 was included here even though information is not available for SPECTRALON material at a thickness of 0.5 mm. In all cases the inventive material was substantially higher in reflectivity than SPECTRALON reflectant material of similar thickness. This difference appears to be even more pronounced as the materials decrease in thickness. It should be noted that the 0.5 mm material of the present invention, even though six times thinner than the 3.0 mm SPECTRALON material, demonstrates equal to or higher reflectivity within the visible wavelengths of 400 to 700 nanometers.

Figure 7:
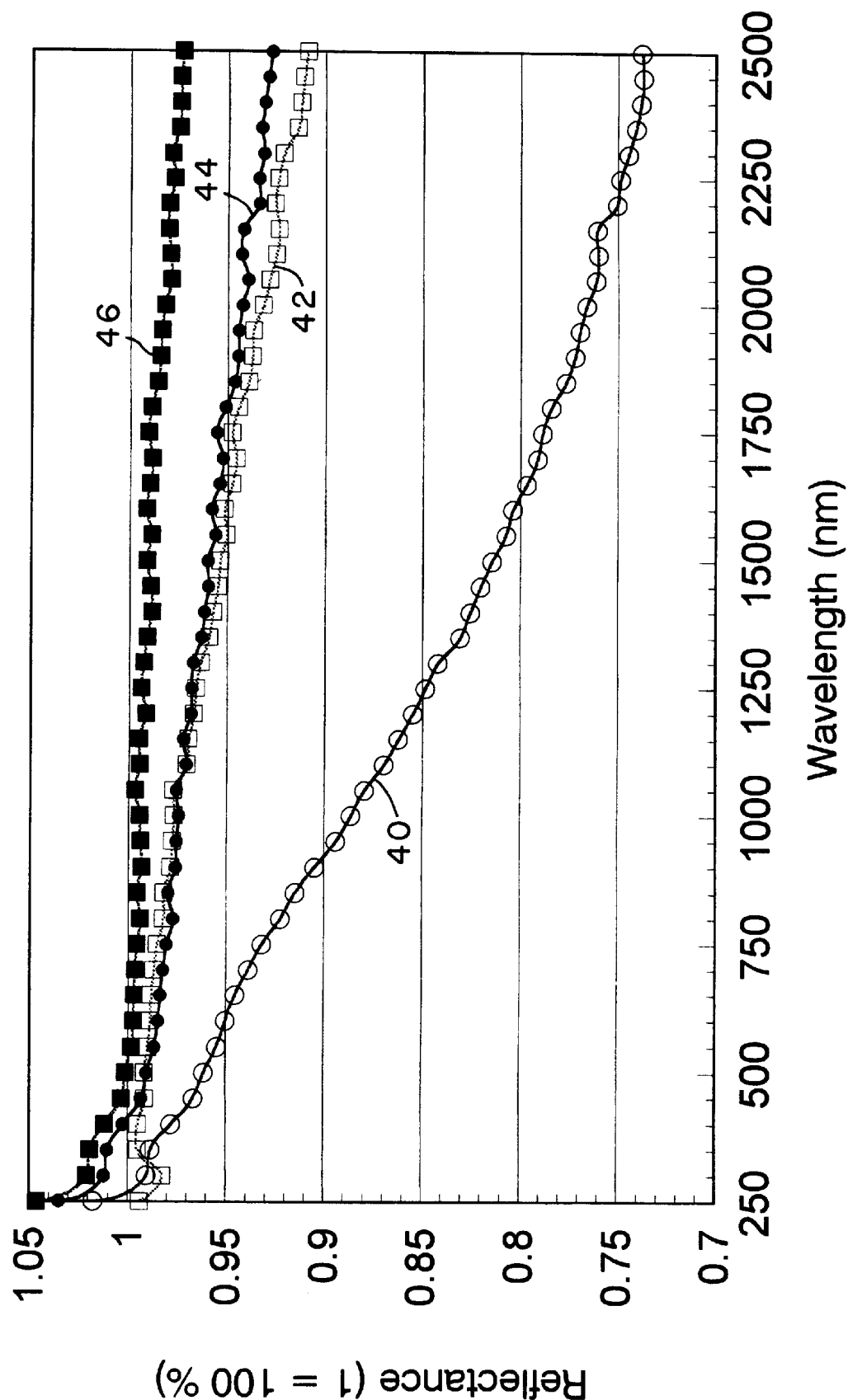
FIG. 7 is a graph plotting the reflectance versus wavelength of various structures of embodiments of the light redirecting materials of the present invention.

The graph of FIG. 7 records the reflectance versus light wavelength of four samples with similar densities of expanded PTFE material of the present invention. Of the four samples, there are two different thickness levels represented, with a coarse and fine structure material at each level. Lines 40 and 42 represent Samples 6 and 7, respectively, each with a relatively coarse structure characterized by large nodes and thick fibrils. Lines 44 and 46 represent Samples 2 and 4, respectively, each having a relatively fine structure characterized by small nodes and fine fibrils.

In like thickness comparisons, the finer structure material demonstrated much higher reflectivity than the coarser structure material at all wavelengths tested. For instance, Sample 2 with a thickness of 10 mm was substantially more reflective than Sample 6 with the same thickness of 1.0 mm.

The above Examples demonstrate that the reflectant material of the present invention performs far better and more consistently as a diffuse reflectant material over a wider spectrum of light than the best diffuse reflectant material presently commercially available.

Figure 8:
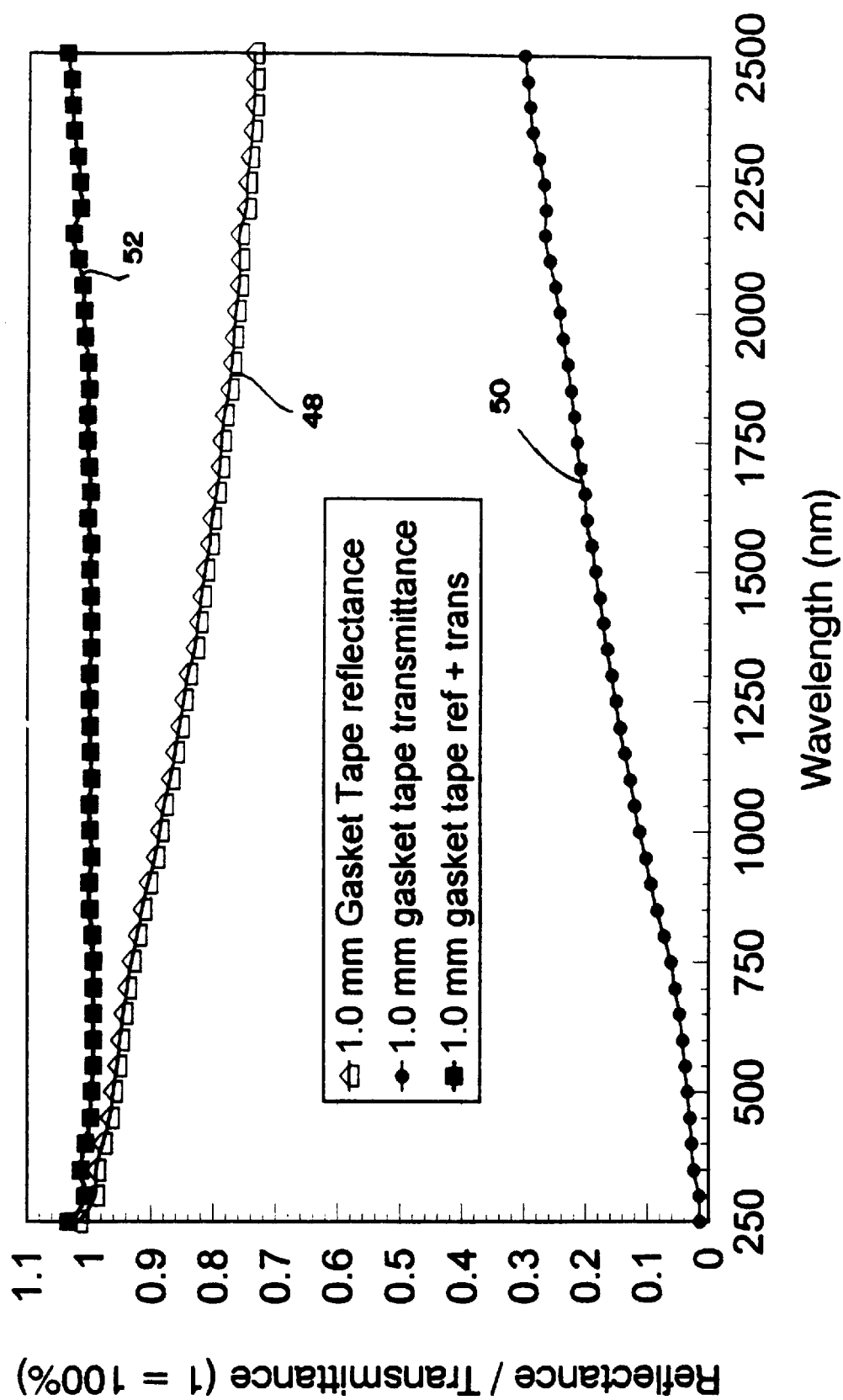
FIG. 8 is a graph plotting reflectance and transmittance versus wavelength of one embodiment of the present invention.

The graph of FIG. 8 plots the reflectance and transmittance versus wavelength of Sample 6. Line 48 represents the reflectance, line 50 represents the transmittance, and line 52 represents the sum of both the reflectance and transmittance. This graph shows that as reflectance decreases along with increased wavelength, the transmittance increases. Light impinging on a surface must either be reflected, transmitted, or absorbed. Absorptance of a material can be determined by the following mathematical formula:

Absorptance=100%−(% reflectance+% transmittance)

This formula shows that when reflectance and transmittance add up to 100%, there is no absorptance of light by the material. Thus, what is demonstrated in this graph is that at all wavelengths measured, the sum of reflectance and transmittance is equal to approximately 100%. Therefore, this material has virtually no absorptance over the entire measured spectrum.

Figure 9:
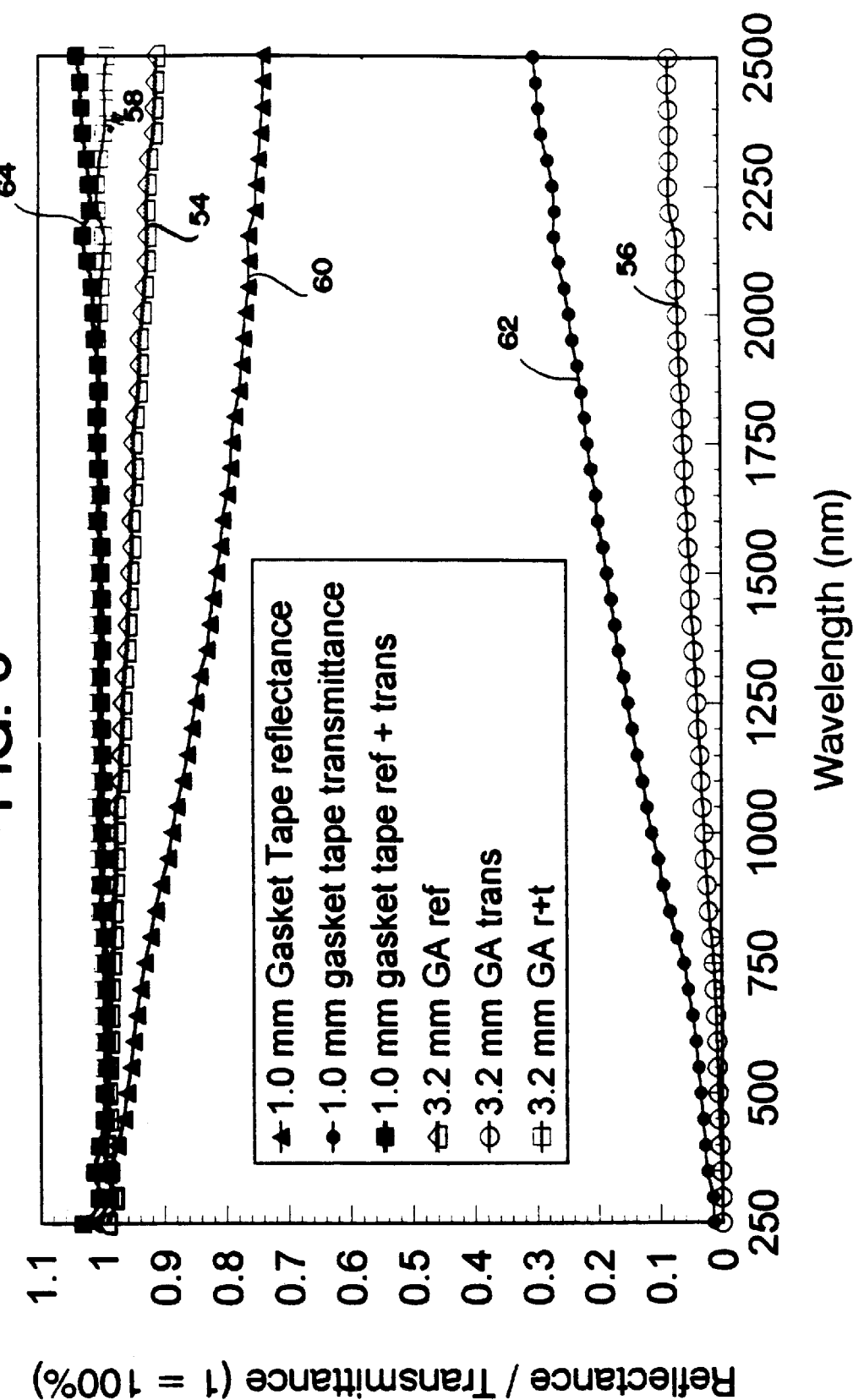
FIG. 9 is a graph plotting reflectance and transmittance versus wavelength of two embodiments of the present invention.

The graph of FIG. 9 records the reflectance, transmittance, and the sum of reflectance plus transmittance for Samples 6 and 7. Line 54 represents the reflectance for Sample 7; line 56 represents the transmitance for Sample 7; and line 58 represents the sum of reflectance and transmittance for Sample 7. Line 60 represents the reflectance for Sample 6; line 62 represents the transmittance for Sample 6; and line 64 represents the sum of reflectance and transmittance for Sample 6.

It should be noted that for both samples the reflectance and transmittance values for the wavelengths tested add up to essentially 100%. This demonstrates that at different thickness levels of the same structure material, reflectance can be traded for transmittance without the loss of light due to absorption.

Figure 10:
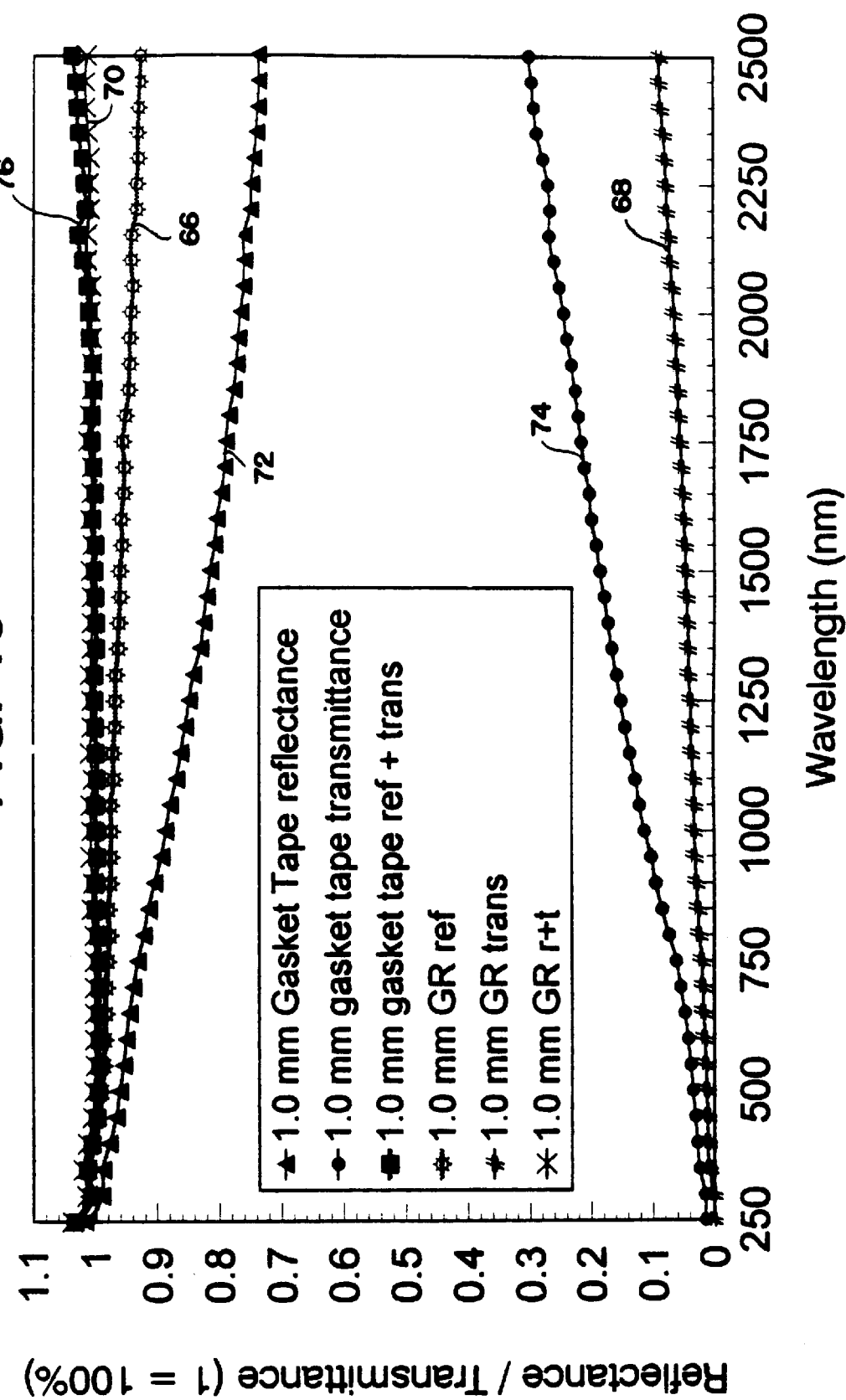
FIG. 10 is a graph plotting reflectance and transmittance versus wavelength of another embodiment of the present invention.

The graph of FIG. 10 records the reflectance, transmittance, and the sum of reflectance plus transmittance for Samples 2 and 6. Line 66 represents the reflectance for Sample 2; line 68 represents the transmittance for Sample 2; and line 70 represents the sum of reflectance and transmittance for Sample 2. Line 72 represents the reflectance for Sample 6; line 74 represents the transmittance for Sample 6; and line 76 represents the sum of reflectance and transmittance for Sample 6.

It should again be noted that for both samples the reflectance and transmittance values for the wavelengths tested add up to essentially 100%. This demonstrates that at the same thickness levels but this time different material structures, one can again trade off reflectance for transmittance without the loss of light due to absorption. Thus, there are at least two ways to control the trade off of reflectance versus transmittance to meet various target specifications for transflective type applications.

Due to the diffuse reflectant and/or transmittant and structural properties of the present invention, it can be used in a plethora of possible applications. As a general reflectant and/or transmittant material, the present invention can be employed to form reflectant and/or transmittant screens (e.g., projection TV or movie screens), reflectors for back lit displays, transflectors for transflective displays, highway information placards, etc. Furthermore, specialized reflectors for fluorescent or incandescent lighting can be designed for hospital or clean room environments where soft diffuse lighting is desired yet cleanliness and contamination must be minimized. Expanded PTFE, because of its inertness and inherent non-particulation characteristics, is ideally suited for these applications.

The high flexibility of the present invention particularly lends itself to such applications since it can be rolled or otherwise compacted, as is often required, and it can be easily formed into different shapes, and particularly nonplanar shapes. The present invention's ability to provide effective reflectance at very thin dimensions also lends itself to use in this regard, particularly by allowing greater design flexibility and by decreasing the cost and weight of the material.

EXAMPLE 5

A sheet of the present invention (designated as Sample 8) was produced in the following manner:

A fine powder PTFE resin was combined with an odorless mineral spirit. The volume of mineral spirits used per gram of fine powder PTFE resin was 0.275 cc/gm. This mixture was aged below room temperature to allow for the mineral spirits to become uniformly distributed within the PTFE fine powder resin. This mixture was compressed into a billet and extruded at approximately 8300 kPa through a 0.71 mm gap die attached to a ram type extruder to form a coherent extrudate. A reduction ratio of 75:1 was used.

The extrudate was then rolled down between two metal rolls which were heated to between 30°–40° C. The final thickness after roll down was 0.20 mm. The material was transversely expanded at a ratio of 3:1 and then the mineral spirits were removed from the extrudate by heating the mass to 240° C. (i.e., a temperature where the mineral spirits were highly volatile). The dried extrudate was transversely expanded at 150° C. at a ratio of 3.5:1. After expansion, the sheet was amorphously locked at greater than 340° C. and cooled to room temperature.

Sample 8: The single layer sheet had the following properties:

Thickness: 0.038 mm

Density: 0.62 g /cc

EXAMPLE 6

A composite sheet (designated as Sample 9) was fabricated by positioning a sheet of Example 5 against a sheet of SILVERLUX SA-85P Specular Aluminum Reflective Film available from 3M Construction Markets Division, St. Paul, Minn. The SILVERLUX was measured to have a thickness of 0.097 mm. The total thickness of the composite sheet, Sample 9, was measured to 0.135 mm.

EXAMPLE 7

A microporous ePTFE membrane 0.025 mm thick of nominal 0.2 μm pore size obtained from W. L. Gore and Associates, Inc. was metalized by vapor depositing aluminum by evaporation and condensation to an optical density of 3.0 density units (as determined on a Densitometer of Tobias Assoc., Inc. Model No. TRX-N). Specifically, aluminum wire was heated in an oxide crucible at a high vacuum ($2 \times 10^{-6}$ Torr at about 1220° C.). The aluminum vaporized. The ePTFE membrane with a film backing to block entry of vapor on one side was passed over the crucible with the backing on the side away from the crucible. Vapor from the crucible rose to form the discontinuous coating on the adjacent side of the membrane. The coated membrane was then wound on a roll. A sample from this coated membrane is designated as Sample 10.

Samples 8, 9, and 10 were tested along with a sample of SILVERLUX SA-85P for comparative levels of diffusivity using a model number PG-3 glossmeter available from Hunter Lab in Roston, Va. This data is reported in Table 1, below:

The instrument is designed to quantify the relative levels of gloss of material surfaces. Gloss is the measurement of light reflected at the specular angle, the angle equal and opposite to the angle of light hitting the sample. For most gloss measurements, light is directed onto a sample at 60° from the perpendicular. The percent of light that is reflected at the specular angle (−60°) is reported as the gloss. While 60° is the most commonly used gloss angle, 85° is used for low gloss samples, and 20° is used for high gloss samples. If the 60° reading is greater than 70, it is suggested by the gloss meter manufacturer to use the 20° angle. If the 60° is less than 10, it is suggested to use the 85° angle.

For measurement of homogeneous surface white reflective materials that are relatively high in total reflectance, it is assumed that low specular reflective measurements indicate a high level of diffusivity. In Table 1, the four (4) different materials mentioned above are compared for levels of gloss, or inversely, levels of diffusivity. It can be seen that the SILVERLUX material is extremely reflective and specular based on high gloss readings at all three angles. The other three materials, Samples 8, 9, and 10, all exhibit relatively low gloss readings at all three angles, demonstrating that these are relatively diffuse reflective materials. It is therefore demonstrated that the inventive diffusely reflective material, such as a membrane of 0.038 mm thick ePTFE, when positioned in front of a highly specular material will result in a composite with very low gloss and therefore a high level of diffusivity.

Samples 8, 9, and 10 were tested along with a sample of SILVERLUX SA-85P for total hemispherical reflectance using CARY 5E Spectrophotometer with a Labsphere integrating sphere as described in Example 4. In addition, Sample 6 was tested for both total hemispherical reflectance and transmittance. The spectral range measured was 175 nm to 2500 nm. As explained in Example 4, the reported range was 250 nm to 2500 nm.

Figure 11:
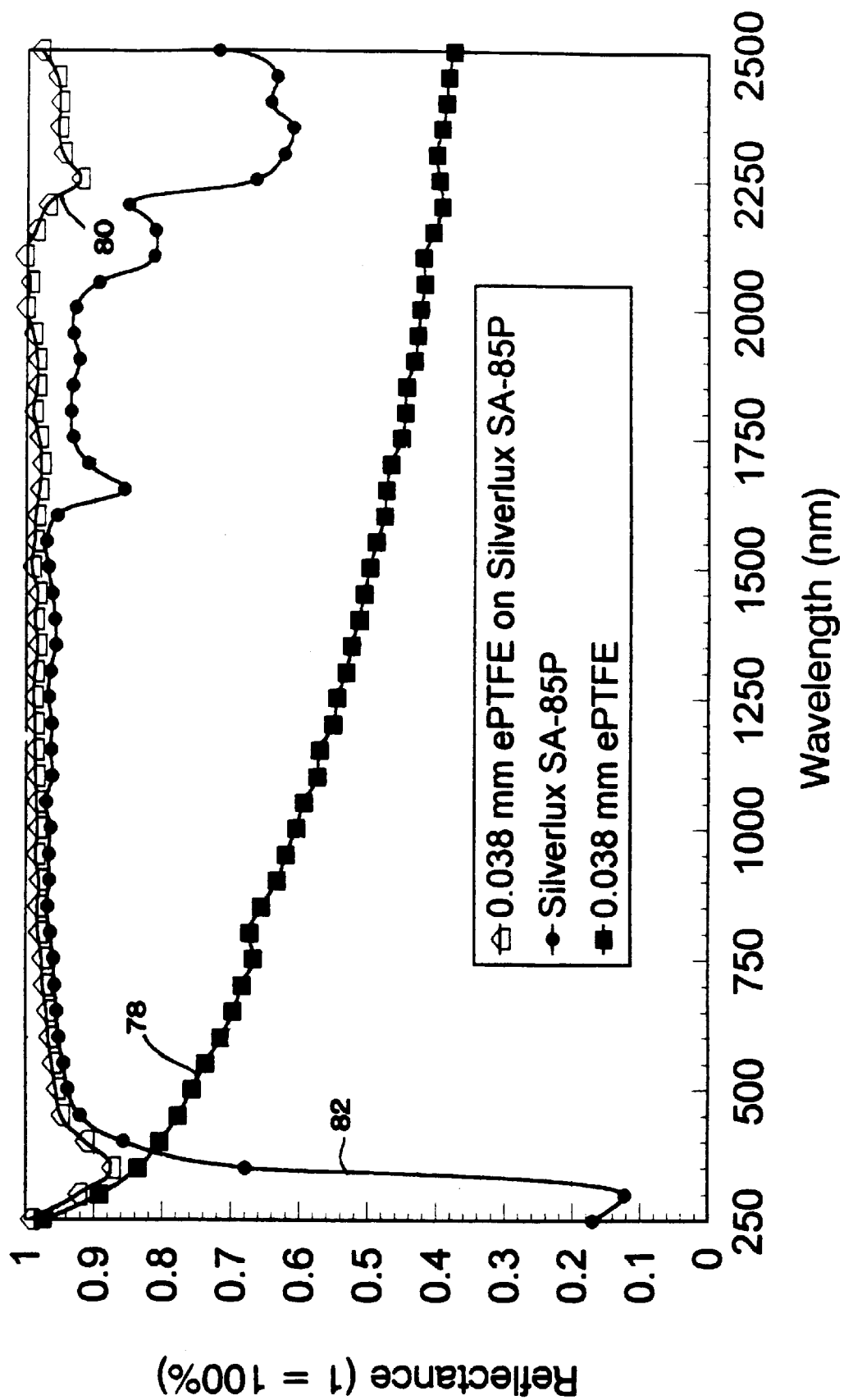
FIG. 11 is a graph plotting reflectance versus wavelength of an embodiment of the present invention, commercially available reflectant material, and an inventive composite material.

The graph of FIG. 11 plots the reflectance versus wavelength of Samples 8 and 9 along with SILVERLUX SA-85P. Lines 78, 80, and 82 represent the reflectance of Samples 8, 9, and SILVERLUX, respectively. This graph shows that by positioning a thin layer of ePTFE in front of a specular reflective material, the specular property of the SILVERLUX material is modified into a diffuse property, as was shown in Table 1, and this inventive material also has increased the total overall reflectance available. Furthermore, the fluctuations of the SILVERLUX reflectance as a function of wavelength has been significantly reduced by the addition of the inventive material. As can be seen, in the range of visible light (450 to 700 nm), the composite material provides greater than 90% diffuse reflectivity.

Figure 12:
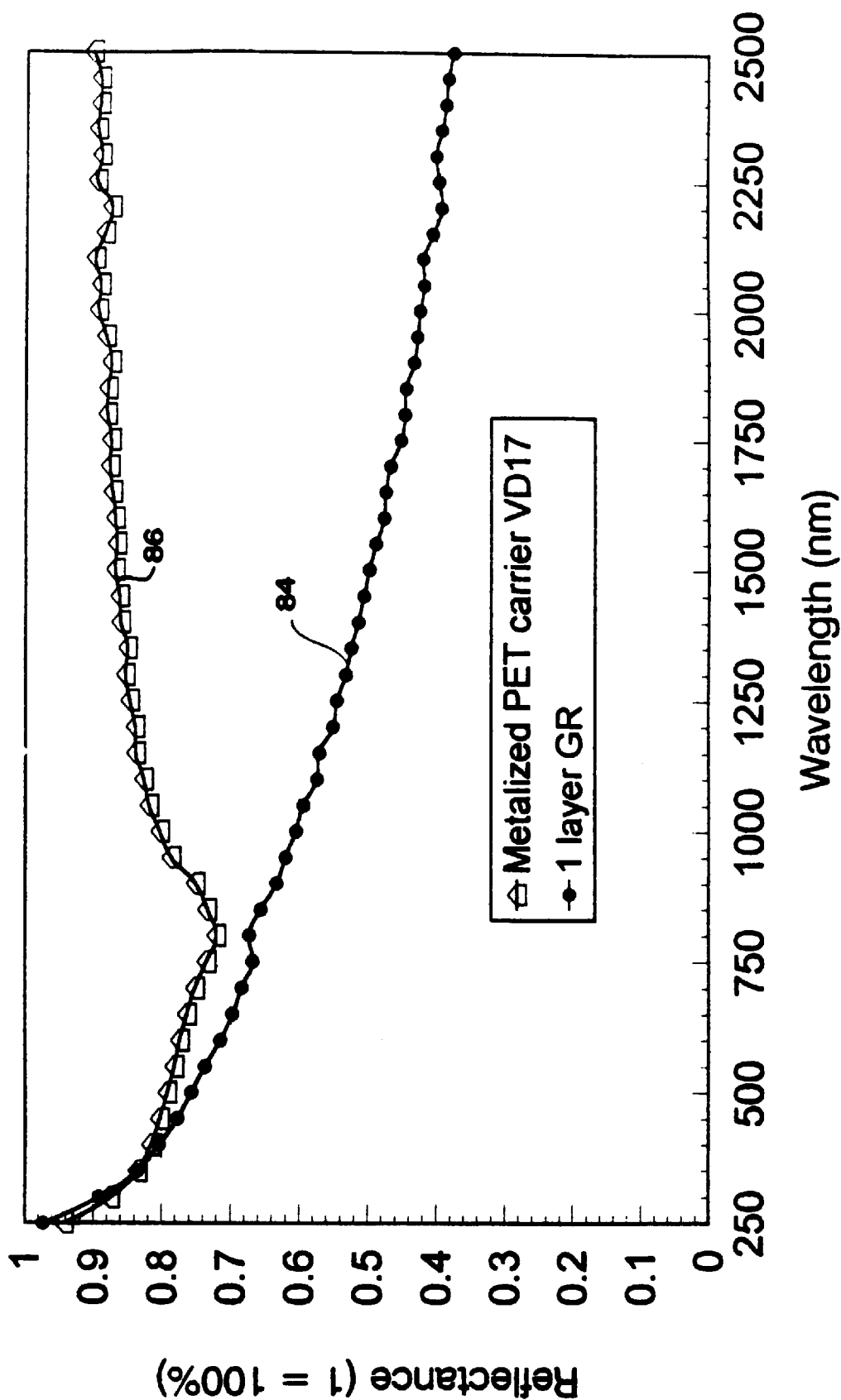
FIG. 12 is a graph plotting reflectance versus wavelength of an embodiment of the present invention and a composite material of the present invention.

The graph of FIG. 12 is another example of the combination of ePTFE membrane and a specular reflector. In this

|  | Silverlux SA-85P | | | 0.038 mm ePTFE | | | 0.038 mm ePTFE/ Silverlux SA-85P | | | Metalized PET carrier VD17 | | |
|---|---|---|---|---|---|---|---|---|---|---|---|---|
| Reading | 20° | 60° | 85° | 20° | 60° | 85° | 20° | 60° | 85° | 20° | 60° | 85° |
| 1 | 185.3 | 199.9 | 149.7 | 1.2 | 4.4 | 35.3 | 1.6 | 5.3 | 39.2 | 1.2 | 3.3 | 7.7 |
| 2 | 185.3 | 199.9 | 148.9 | 1.1 | 4.1 | 19.4 | 1.5 | 4.4 | 21.6 | 1.2 | 3.4 | 5.4 |
| 3 | 185.3 | 199.9 | 148.4 | 1.1 | 3.9 | 11.9 | 1.5 | 4.3 | 13.6 | 1.2 | 3.5 | 11.4 |
| Average | 185.3 | 199.9 | 149.0 | 1.1 | 4.1 | 22.2 | 1.5 | 4.7 | 24.8 | 1.2 | 3.4 | 8.2 | case, as describe in Example 7, a thin coating of aluminum was applied to the layer of ePTFE by vapor deposition. As can be seen from the graph, the overall reflectance of the ePTFE membrane, line 84, was increased by the addition of the metal layer, line 86. Again as shown in Table 1, the composite material maintains highly diffuse reflectance rather than the specular characteristics of the metal alone.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method of redirecting light comprising providing a light redirecting material comprising a structure of expanded polytetrafluoroethylene having polymeric nodes interconnected by thread like fibrils emerging from the nodes, and defining microporous voids therein;

mounting the light redirecting material to cause light energy to contact the material and transflect from it;

whereby the light redirecting material provides diffuse transflectivity of the light energy contacting the material, with greater than 90% of the light energy contacting the material being transflected from it.

2. The method of claim 1 that further comprises providing as the light redirecting material a flexible sheet of expanded polytetrafluoroethylene, allowing the light redirecting material to be readily formed into different shapes; and forming the light redirecting material to provide a non-planar transflective surface.

3. The method of claim 1 that further comprises mounting the light redirecting material with a light source on one side of the material; and causing light from the light source to diffuse through the light redirecting material to provide an even dispersion of light transmitted through the material.

4. The method of claim 1 that further comprises placing the light redirecting material next to a second light reflectant material; and causing light from a light source to pass through the light redirecting material and reflect from the second light reflectant material.

5. The method of claim 4 that further comprises causing light form the light source to pass a second time through the light redirecting material after reflecting from the second light reflectant material.

6. The method of claim 1 that further comprises employing the light redirecting material as a light transflective panel.

7. The method of claim 1 that further comprises providing as the light redirecting material a material that transflects over 95% of the light energy in the range of 250 to 750 nm contacting it.

8. The method of claim 1 that further comprises providing as the light redirecting material a material that transflects over 99% of the light energy in the range of 250 to 750 nm contacting it.

9. A method of redirecting light comprising providing a light redirecting material comprising a structure of expanded polytetrafluoroethylene having polymeric nodes interconnected by thread like fibrils emerging from the nodes, and defining microporous voids therein;

mounting the light redirecting material to cause light energy to contact the material and transflect from it;

whereby the light redirecting material provides diffuse transflectivity of the light energy contacting the material, with greater than 99% of the light energy contacting the material being transflected from it.

* * * * *